United States Patent
Ando et al.

(10) Patent No.: US 10,766,082 B2
(45) Date of Patent: Sep. 8, 2020

(54) BLADES

(71) Applicant: KANEFUSA KABUSHIKI KAISHA, Niwa-gun, Aichi (JP)

(72) Inventors: Mikihiro Ando, Aichi (JP); Atsushi Tsuchiya, Aichi (JP)

(73) Assignee: KANEFUSA KABUSHIKI KAISHA, Niwa-Gun, Aichi-Ken (JP)

(*) Notice: Subject to any disclaimer, the term of this patent is extended or adjusted under 35 U.S.C. 154(b) by 315 days.

(21) Appl. No.: 15/761,852

(22) PCT Filed: Oct. 6, 2016

(86) PCT No.: PCT/JP2016/079782
§ 371 (c)(1),
(2) Date: Mar. 21, 2018

(87) PCT Pub. No.: WO2017/065082
PCT Pub. Date: Apr. 20, 2017

(65) Prior Publication Data
US 2018/0272447 A1    Sep. 27, 2018

(30) Foreign Application Priority Data

Oct. 15, 2015   (JP) .................................. 2015-203654

(51) Int. Cl.
| | | |
|---|---|---|
| *B23D 61/02* | (2006.01) | |
| *B27B 33/08* | (2006.01) | |
| *B24D 5/12* | (2006.01) | |
| *B23D 61/04* | (2006.01) | |

(52) U.S. Cl.
CPC ......... *B23D 61/026* (2013.01); *B23D 61/021* (2013.01); *B23D 61/04* (2013.01); *B24D 5/12* (2013.01); *B27B 33/08* (2013.01)

(58) Field of Classification Search
CPC .... B24D 61/026; B24D 61/021; B24D 61/04; B24D 5/12
USPC ........................................................ 451/548
See application file for complete search history.

(56) References Cited

U.S. PATENT DOCUMENTS

| | | | |
|---|---|---|---|
| 6,845,767 B2 * | 1/2005 | Sakarcan ............. | B23D 61/025 125/15 |
| 2001/0023690 A1 | 9/2001 | Lee et al. | |
| 2003/0094078 A1 | 5/2003 | Clanton | |
| 2010/0112620 A1 | 5/2010 | Hayakawa et al. | |

(Continued)

FOREIGN PATENT DOCUMENTS

| | | |
|---|---|---|
| CN | 203471599 U | 3/2014 |
| JP | S56-143003 U | 10/1981 |
| JP | S61-192802 U | 12/1986 |

(Continued)

OTHER PUBLICATIONS

European Search Report dated May 2, 2019, for European Application No. 16855336.0 (7 p.).

(Continued)

*Primary Examiner* — George B Nguyen
(74) *Attorney, Agent, or Firm* — Conley Rose, P.C.

(57) ABSTRACT

A cutting or grinding tool includes a blade. The blade includes a disc-shaped base metal, cutting or grinding tips (edges) provided on a peak (outer circumferential edge) of the base metal, and a protruding coating on a side face of the base metal along the entire outer circumference of the base metal.

14 Claims, 6 Drawing Sheets

(56) References Cited

U.S. PATENT DOCUMENTS

2010/0122620 A1\* 5/2010 Ruthven .............. B23D 61/026
                                                            83/835
2015/0021099 A1    1/2015 Shaw

FOREIGN PATENT DOCUMENTS

| JP | S61192802 U | 12/1986 |
| JP | H1071522 A  | 3/1998  |
| JP | 4406302 B2  | 1/2010  |

OTHER PUBLICATIONS

PCT/JP2016/079782 International Search Report and Written Opinion dated Nov. 1, 2016 (6 p.).

\* cited by examiner

BLADES

CROSS-REFERENCE TO RELATED APPLICATIONS

The present application is a 35 U.S.C. § 371 national stage application of PCT Application No. PCT/JP2016/079782, filed Oct. 6, 2016, which claims priority to Japanese Patent Application No. 2015-203654, filed Oct. 15, 2015, both of which are incorporated by reference herein in their entireties for all purposes.

STATEMENT REGARDING FEDERALLY SPONSORED RESEARCH OR DEVELOPMENT

Not applicable.

TECHNICAL FIELD

The present disclosure relates to a blade for cutting or grinding wood, wood boards, resin, aluminum or the like.

BACKGROUND

Conventional blades include a disc-shaped base metal and cutting or grinding edges provided on the outer circumferential edge of said base metal (see e.g., Publication of Japanese Patent No. 4406302). In the mentioned publication, a technique for coating the blade, in which a fluorine resin is entirely coated on both surfaces of the base metal, is disclosed. The fluorine resin coating on the base metal reduces frictional resistance to suppress heat and associated deformation of the base metal.

BRIEF SUMMARY

According to one aspect of the present disclosure, a blade may include a disc-shaped base metal, with cutting or grinding edges provided on an outer circumferential edge of the metal base, and a protruding coating on a face or both faces of the base metal (parallel to a radial plane of the blade) along the entire outer circumference of the base metal, beyond a certain radial length, up to the radial edge.

Therefore, with the protruding coating applied in a circumferential manner on the outer circumference of both side faces of the base metal, the surface area of the region of contact between the base metal and the workpiece is greatly reduced as compared with an embodiment in where a coating is applied to the entire blade, to its full radial extent, on both faces of the base metal parallel to the radial plane of the blade. As a result, with a reduced contact region of surface area, it is possible to reduce the frictional resistance due to the reduction of friction coefficient. Because of the reduction of the friction coefficient of the metal base, burn on the base metal as well as an increase in cutting resistance may be reduced.

According to another aspect of the disclosure, a coating may include a plurality of protruding coating elements arranged in a circumferential or radial direction of the base metal at a spaced apart intervals of a predetermined circumferential or radial length. As a result, the contact areas between the side faces of the base metal and the workpiece may be substantially reduced. In this way, it is possible to further reduce the burn of the base metal and the cutting resistance.

According to another aspect, the coating elements may be formed in a line. This may improve the design.

According to another aspect, the coating elements may be arranged at a predetermined angle with respect to a virtual tangent line contacting the outer circumferential edge of the base metal. Thus, when the blade rotates, the coating elements come into contact with the workpiece at said predetermined angle. As a result, the friction coefficient may be further reduced.

According to another feature, the coating may have an outermost layer containing a lubricating substance. Therefore, the frictional resistance at a contact portion with the workpiece may further be reduced.

DETAILED DESCRIPTION

Exemplary embodiments of the blades according to the present invention will be described with reference to FIGS. 1 to 6. The blade may comprise a disc-shaped base metal, may be provided with cutting or grinding edges on an outer circumference of the base metal. In the present embodiment, out of various blades, a tipped saw blade is illustrated and described as a cutting blade.

Figure 1:
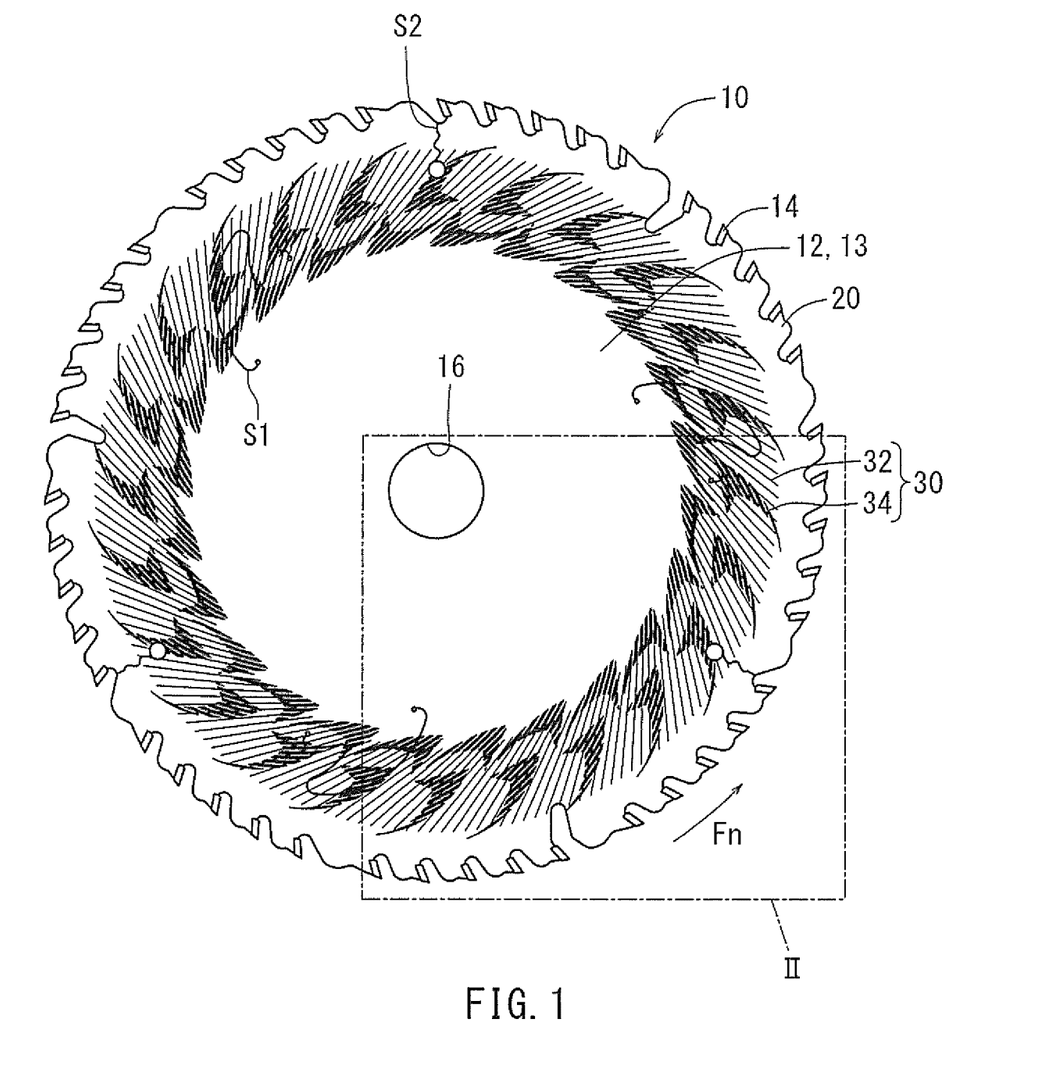
FIG. 1 is a plan view of a tipped saw blade according to a first embodiment.
Figure 2:
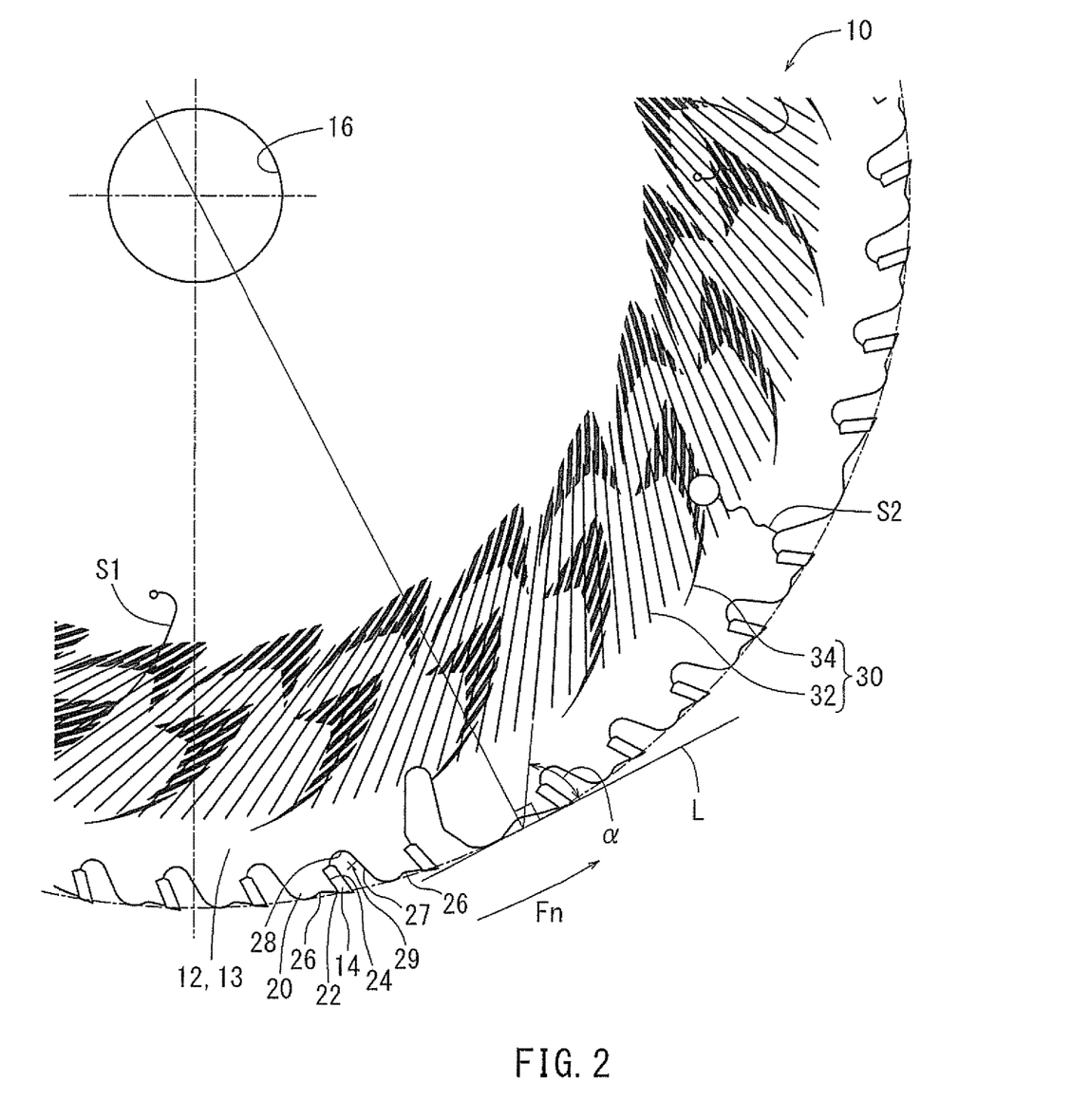
FIG. 2 is a partially enlarged plan view of the tipped saw blade of FIG. 1 take in section II of FIG. 1.

The tipped saw blade 10 according to the first embodiment may be a disc-shaped blade with a design similar to that of a circular saw blade, a side milling cutter as shown in FIGS. 1 and 2 or the like. The tipped saw blade 10 may have a base metal 12 and a plurality of tips 14 (cutting edges) provided on the outer circumference of the base metal 12. The center of the base metal 12 is provided with a circular fitting hole 16 extending axially through the radial center of base metal 12 perpendicular to the radial plane of the blade 10.

As shown in FIGS. 1 and 2, the tipped saw blade 10 may have a plurality of tip mounting portions 20 at the outer circumference of the base metal 12. The tip mounting portions 20 are arranged, for example, at predetermined center angle pitches and project radially outward at an angle from a main body of the base metal 12. The tip mounting portions 20 are formed as chevron-type V shapes. A peak 22 of each tip mounting portion 20 projects radially outward and is located on a leading side end of each respective tip mounting portion 20 relative to the cutting rotational direction Fn of the blade 10. Peaks 22 extend radially to the radially outer circumference of the blade 10 as indicated by the dot-dash line in FIG. 2.

As shown in FIGS. 1 and 2, each tip mounting portion 20 may include a tip mounting surface 24 on an outer peripheral side of the tip mounting portion 20 radially inward from the peak 22 oriented at an angle greater than 90 degrees relative to the tangent to the circumference of the blade at the associated peak 22 (see for example, the tangent line L in FIG. 2 and the positioning of the associated peak 22 on that line). Each tip mounting portion 20 also includes an outer peripheral surface 26 oriented along the rotational direction Fn approximately along the circumferential boundary of the blade (see dot-dash line in FIG. 2) on the outer peripheral boundary of the peak 22. Further, each tip mounting portion 20 is also formed with an outer peripheral inclined surface 27 which extends inward of the circumferential boundary of the blade (see the dot-dash line in FIG. 2) from a point radially inward of the peak 22 toward the outer peripheral surface 26 of an adjacent tip mounting portion 20 in the rotational direction Fn. An arched surface 28 recessed radially inward is formed between the outer peripheral inclined surface 27 and the tip mounting surface 24. A gullet 29 is formed in the interior of the radially inward space enclosed by the tip mounting surface 24, the outer peripheral inclined surface 27, and the arched surface 28, where surfaces 24, 28, and 27, are in sequential order respectively with respect to the rotational direction Fn. A stepped ledge for the tip 14 to be seated upon is formed on the mounting surface 24. The base metal 12 may have inner slots S1 formed by making cuts into a plate face of the blade 10. Some areas respectively located between the tip mounting portions 20 may also be formed with outer circumference slots S2 which are formed by cutting radially inwards into the radial plane of the blade 10 from the gullet 29. Moreover, the tip mounting surfaces 24 are cut and finished by a milling cutter, etc. As shown in FIG. 2, a tip 14 is firmly fixed to each tip mounting surface 24 with a brazing material or the like. The tips 14 are formed of hard tips made of a rectangular hard material such as cemented carbide or cermet, or high hardness tips formed of a high-hardness sintered body such as polycrystalline diamond.

As shown in FIGS. 1 and 2, the tipped saw blade 10 may include a protruding coating 30 on the side face 13 of the base metal 12 parallel to the radial plane of the blade 10, along the entire outer circumference of the base metal 12. Further, the protruding coating 30 includes a plurality of coating elements 32 spaced apart in the circumferential direction of the base metal 12 at predetermined intervals. Each coating element 32 here is formed as a line (see FIG. 1). The line here is a straight linear line. The linear coating elements 32 are arranged at an angle α with respect to the virtual tangent line L tangent to a peak 22 and outer peripheral surface 26 of a tip mounting portion 20 proximate to said coating elements 32, where said components 22 and 26 of the tip mounting portion 20 define the outer circumferential edge of the base metal 12 (see FIG. 2). The angle α is preferably 15 to 90 degrees. The film thickness of each coating element 32 is preferably 6 to 40 μm. The plurality of linear coating elements 32 are provided spaced apart at a predetermined intervals in the circumferential direction. In addition, the protruding coating 30 may include the outermost layer containing a lubricating substance. An area "on the side face (or faces) 13 along the entire outer circumference of the base metal 12" may desirably be defined as the entire 360° radial extent of the base metal 12 on a side face parallel to the radial plane of the blade. However, it is sufficient if said area occupies about 75% of the 360° radial extent of the base metal 12. The outer circumference excludes the center area where a flange (not shown) comes into contact through the circular fitting hole 16 to fix the tipped saw blade 10 (blade) to a machining tool. This may also be applied to the following embodiments.

The tipped saw blade 10 is first coated with a flat layer of paint on the entire side face (or faces) 13 of its base metal 12 parallel to the radial plane of the blade. This first layer of paint may be a melamine based white paint, a melamine resin paint, an acrylic resin paint, nickel plating, chrome plating or the like, wherein the paint chosen has a rust prevention effect. The film thickness of the first layer of paint is preferably 5 to 25 μm. Subsequently, a second layer of green paint containing fluorine resin (polytetrafluoroethylene, polyethylene fluoride) is applied by screen printing on a face 13 or both faces 13 of the base metal 12 (parallel to a radial plane of the blade) along the entire outer circumference of the base metal 12, beyond a certain radial length, up to the radial edge. The second layer of paint forms the linear coating elements 32, and has a film thickness of 10 μm. The coating elements 32 are applied to the side face parallel to the radial plane of the blade by the screen printing and are sintered by a UV light-curing device. The UV light-curing device is capable of sintering the coating elements 32 in a short time. Alternatively, it is also possible to bake the coating elements 32 onto the side face 13 with hot air generated by a baking apparatus instead of the sintering process by the UV light-curing device. When the baking apparatus is adopted, work efficiency is high and energy is saved. Here, the coating elements 32 are arranged at an angle α with respect to a proximate virtual tangent line L, as described above, at regularly spaced predetermined intervals in the circumferential direction. Next, a third layer of paint forms a plurality of coating elements 34 forming linear lines of varied width while being arranged one over another at a predetermined interval in a V-shape (see FIG. 1). In this way, the tipped saw blade 10 with the protruding coating 30, where 30 includes coating elements 32 and coating elements 34, can be made.

Figure 3:
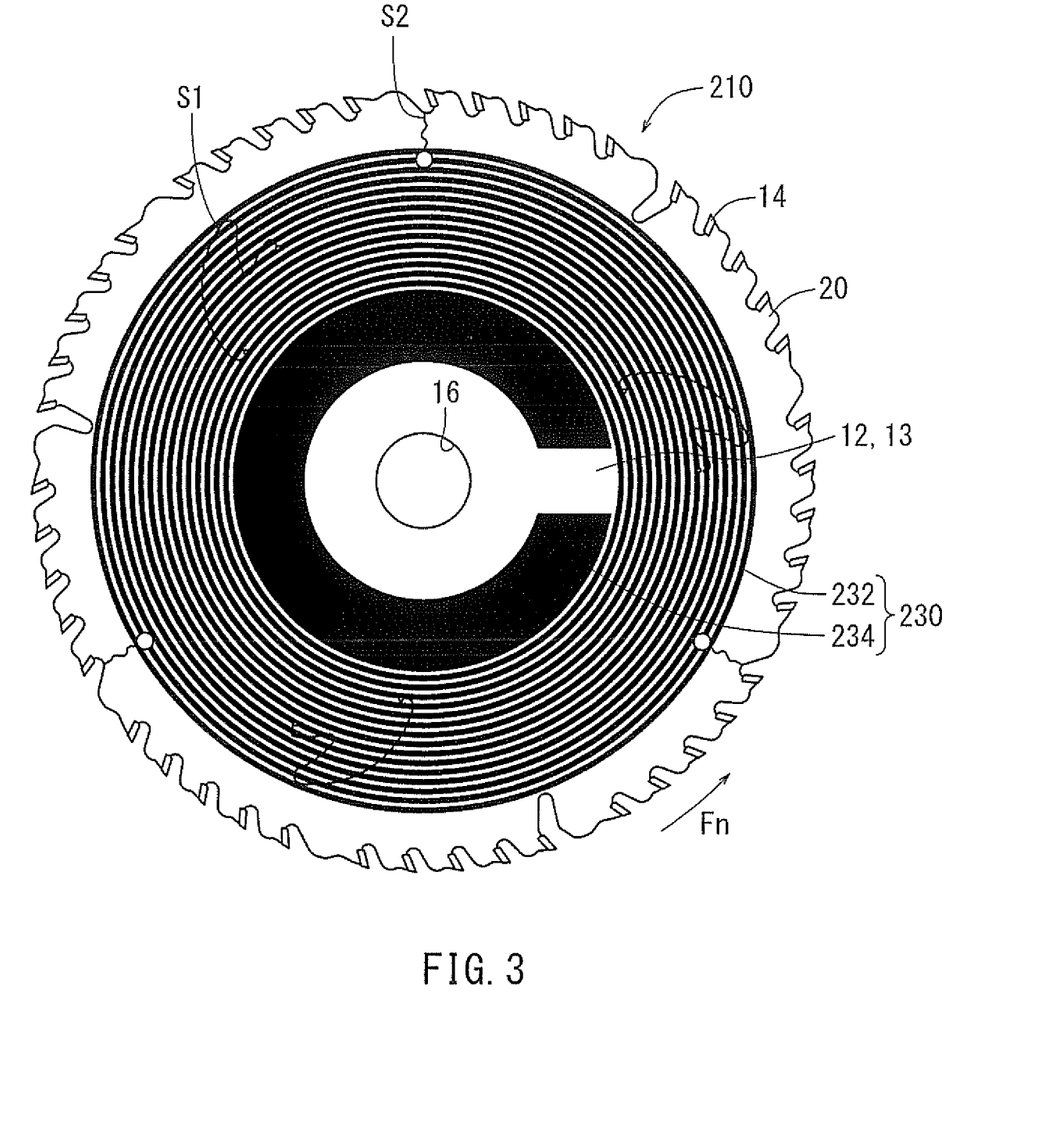
FIG. 3 is a plan view of a tipped saw blade according to a second embodiment.

As shown in FIG. 3, a tipped saw blade 210 according to the second embodiment may include a protruding coating 230 on the side face (or faces) 13 of the base metal 12 along the entire outer circumference of the base metal 12. A primary structure of the tipped saw blade 210 is the same as the tipped saw blade 10 according to the first embodiment, however, the structure of the protruding coating 230 is different. The protruding coating 230 includes a plurality of coating elements 232 beyond a certain radial distance, up to the radial edge coinciding with the circumferential border, spaced apart in the radial direction of the base metal 12 at predetermined intervals. Each coating element 232 is formed as an arc. Each arc here is formed in a complete circle. Also, the protruding coating 230 may include the outermost layer containing a lubricating substance.

The tipped saw blade 210 is coated with a flat first layer of a melamine-based white paint on the entire side face (or faces) 13 of its base metal 12. The second layer is made to have patterns formed with a coating element 234 as a C-shaped strip-like flat surface proximate to the center of the side face 13 parallel to the radial plane of the base metal 12, wherein coating element 234 is spaced a predetermined radial distance from the center and extends radially up to the radial length where the coating elements 232 are formed. The second layer also includes a plurality of coating elements 232 extending in concentric circular arc shapes of incrementally increasing radii along the entire outer circumference of the blade. The strip-like coating element 234 and the circle coating elements 232 are coated with black paint containing fluorine resin by screen printing at a film thickness of 10 μm.

Figure 4:
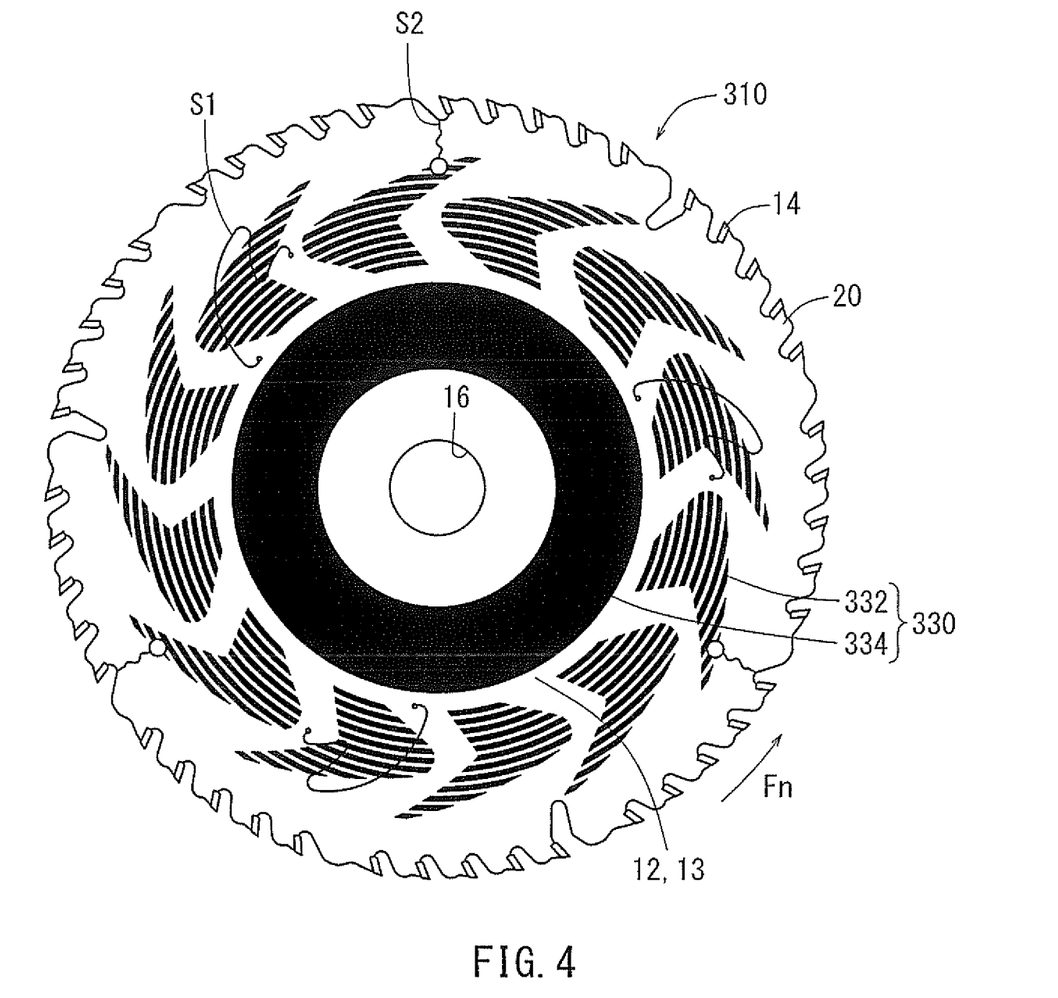
FIG. 4 is a plan view of a tipped saw blade according to a third embodiment.

As shown in FIG. 4, a tipped saw blade 310 according to the third embodiment includes a protruding coating 330 on the side face (or faces) 13 of the base metal 12 along the entire outer circumference of the base metal 12. A primary structure of the tipped saw blade 310 is the same as the tipped saw blade 10 according to the first embodiment, however, the structure of the protruding coating 330 is different. The protruding coating 330 may include a plurality of coating elements 332 spaced apart in the circumferential and radial directions of the base metal 12 at predetermined intervals. Each coating element 332 is formed in a line. The line here is formed in an arc, where arcs in circumferential proximity collectively form V-shapes across the circumferential perimeter of the blade. A plurality of the arc-shaped coating elements are spaced apart at predetermined intervals in the circumferential and radial directions. Also, the coating may include the outermost layer containing a lubricating substance.

The tipped saw blade 310 may be coated with a flat first layer of a melamine-based gray paint on the entire side face (or faces) 13 of its base metal 12 parallel to the radial plane of the blade. A second layer of coating may be applied, consisting of a coating element 334 including a circular strip-like flat surface arranged in close proximity to but spaced apart by a predetermined radial distance from the center of the side face 13 on the base metal 12 parallel to the radial plane of the blade, and groups of a plurality of the V-shaped arched convex coating elements 332 that are concentric arcs of different radius and different circumferential arc lengths along the entire outer circumferential perimeter of the blade. These groups of the V-shaped coating elements 332 are arranged in a circumferential direction along the entire outer circumference at a predetermined interval. The strip-like coating element 334 and the arched convex coating elements 332 are coated with black paint including fluorine resin by screen printing at a film thickness of 20 μm.

Figure 5:
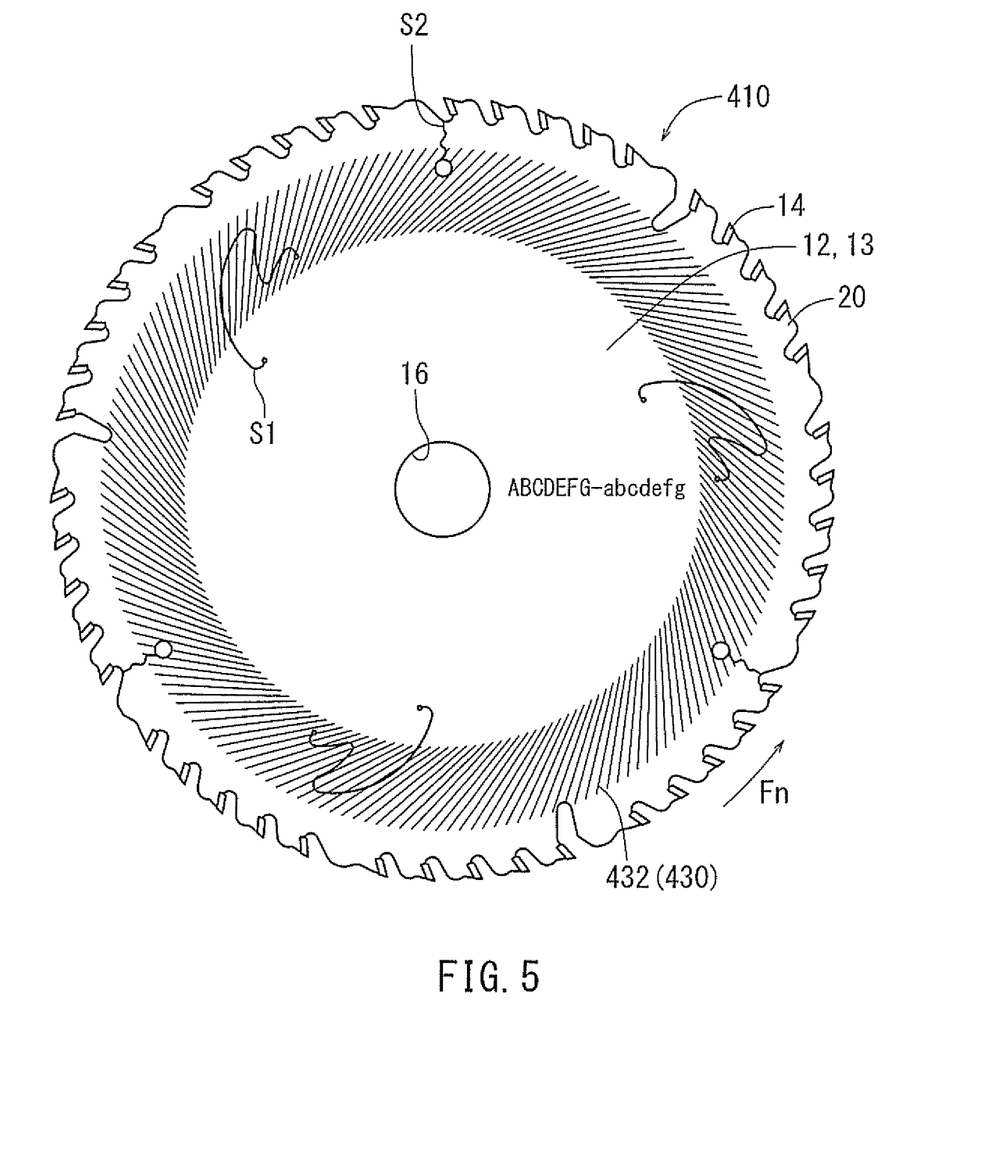
FIG. 5 is a plan view of a tipped saw blade according to a fourth embodiment.

As shown in FIG. 5, a tipped saw blade 410 according to the fourth embodiment is coated with a protruding coating 430 including linear coating elements 432 similar to the tipped saw 10 according to the first embodiment, and has letters printed in its center region.

Figure 6:
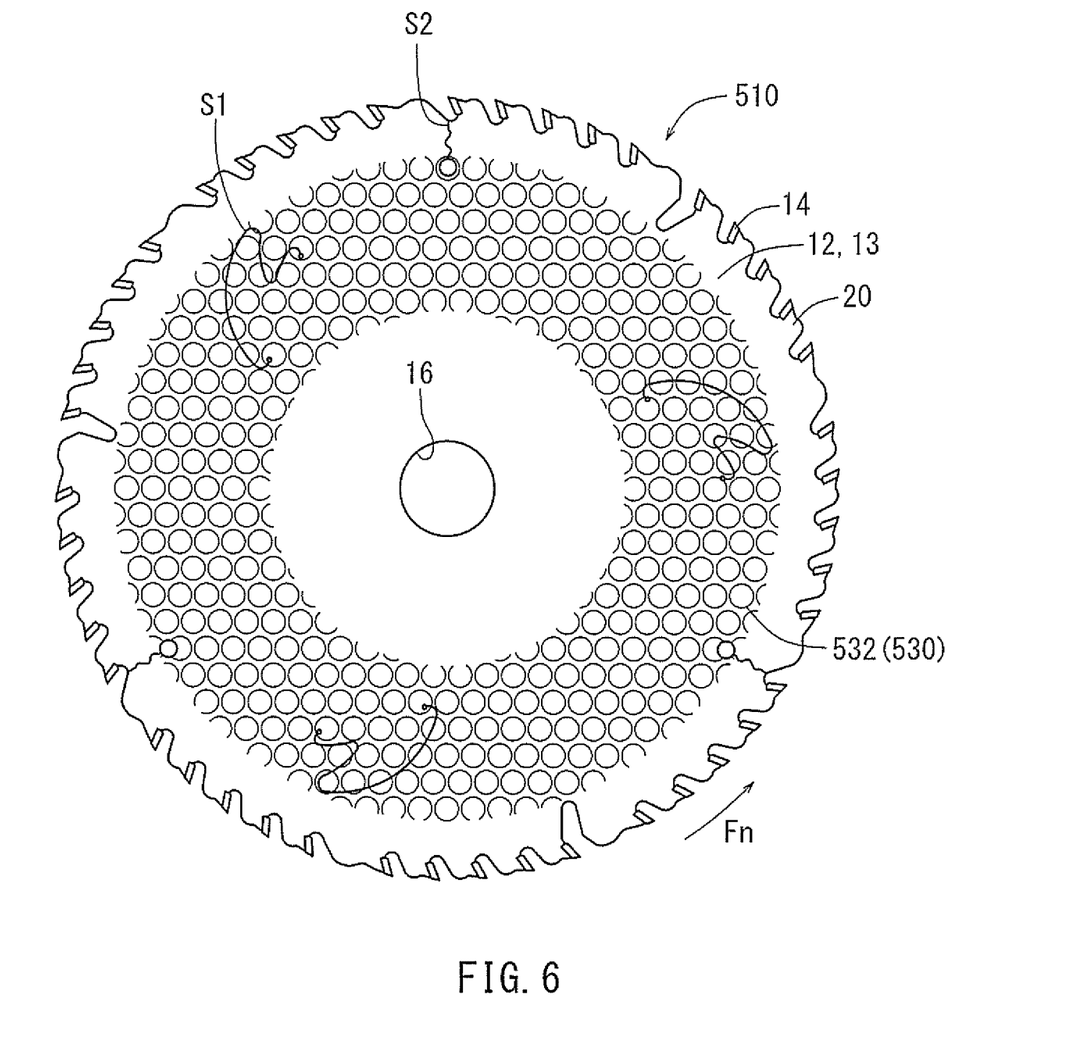
FIG. 6 is a plan view of a tipped saw blade according to a fifth embodiment.

As shown in FIG. 6, the tipped saw blade 510 according to the fifth embodiment is coated with a flat first layer of a melamine-based gray paint on the entire side face (or faces) 13 of its base metal 12 parallel to the radial plane of the blade. The second layer is a protruding coating 530 including a plurality of coating elements 532 each of which having a circular shape which are arranged, to be arranged in rows of adjacent circular elements covering the entire outer circumference at a predetermined spaced apart intervals in the circumferential and radial directions beyond a certain radial length, up to the radial edge of the blade.

As an alternative method to the above first to fifth embodiments, it may also be possible to form the first layer with a linear protruding coating first and subsequently form the second layer on the entire side face (or faces) 13 of the base metal 12 with a coating containing at least one of the fluorine resin, boron nitride, molybdenum disulfide, graphite etc. as a lubricating substance. A tipped saw blade with the protruding coating may be obtained also with this method.

Experiment 1 was performed on the tipped saw blade according to the above embodiments. Experiment 1 related to the use of a paint containing a lubricating substance. First, a sample (a) was prepared wherein the sample (a) was screen printed with a black paint not containing a lubricating substance to form a coating with a film thickness of 20 to 25 μm and sintered by a UV light-curing device. Subsequently, a sample (b) was prepared wherein the sample (b) was screen printed with a black paint containing a lubricating substance to form a film thickness of 20 to 25 μm and sintered by a UV light-curing device. The friction coefficient of these samples (a) and (b) was measured. It was learned that the friction coefficient of the sample (b) is reduced by approximately 56% from the friction coefficient of the sample (a). With this Experiment 1, it could be confirmed that the friction coefficient of each tipped saw blade according to the above embodiments could be reduced with the paint containing a lubricating substance.

Next, Experiment 2 was performed on the tipped saw blade according to the above embodiments. Experiment 2 related to coating a protruding coating on the tipped saw blade. First, a tipped saw blade (c) was prepared, which was coated with a paint containing fluorine resin as a lubricating substance as in the second embodiment. Subsequently, a tipped saw blade (d) was prepared wherein the tipped saw blade (d) was coated with a paint not containing a lubricating substance as in the first embodiment. Further, a tipped saw blade (e) was prepared wherein the tipped saw blade (e) was coated with a fluorine resin on its both entire side faces of the base metal parallel to the radial plane of the blade. Frictional resistance was measured while a wood piece and a weight on this wood piece were placed on the side face of the base metal of each of these tipped saw blades (c), (d) and (e). As a result, it was learned that the friction coefficient of the tipped saw blade (e) was greater than that of the tipped saw blades (c) and (d). It was also learned that the difference between the friction coefficient of the tipped saw blade (e) and the friction coefficient of the tipped saw blade (c) or (d) increases as the load applied is greater, commensurate with the increase in weight. Further, it was learned that the friction coefficient of the tipped saw blade (c) was smaller than that of the tipped saw blade (d).

Two effects were learned as a result of the above Experiments 1 and 2. The two effects are that the frictional coefficient of the tipped saw blade may be reduced by using a paint containing a lubricating substance, and the frictional resistance may be reduced by applying a protruding coating on the tipped saw blade. It could be confirmed that the tipped saw blades according to the above-described first to fifth Embodiments could be the tipped saw blades with reduced frictional resistance.

As described above, the tipped saw blade 10 according to the present embodiment may include a disc-shaped base metal 12, cutting tips 14 provided on the tip mounting portions 20 of the base metal 12, and a protruding coating 30 on the side faces 13 of the base metal 12 along the entire outer circumference of the base metal 12 parallel to the radial plane of the blade. With this structural configuration, as described, the surface area of the contact region of the base metal 12 with the workpiece is substantially reduced compared with a configuration of an analogous blade where the coating instead of applied as in this invention, is instead applied on the entire surface area of both side faces 13 of the base metal 12 parallel to the radial plane of the blade. As a result of the difference in structural configuration, the reduction in the frictional resistance can be achieved due to the reduction in the friction coefficient. The burn on the base metal 12 as well as the increase in the cutting resistance can be suppressed due to the reduction in the frictional resistance of the base metal 12. The above effects are also present in the tipped saw blades 210, 310, 410 and 510.

The above coating elements 32, 232, 332, 432 and 532 are linear or arc shaped. The coating elements 34 are preferably formed as separate arcs, however, they may also be formed as a plane (an expanding V-shape having a predetermined area) because the coating elements 32 would in that case still have effects as lines in the regions where the V-shapes are present.

The coating elements 32 and 432 are preferably arranged at an angle α with respect to the virtual tangent line L being tangent to an associated peak 22 (the outer circumferential edge) of the base metal 12 of a tip mounting portion 20 proximate to said coating elements. Accordingly, the coating elements 32 and 432 contact the workpiece at the angle α when the tipped saw blade 10 or 410 rotates. As a result, due to this particular contact angle, reduction in the frictional resistance may be achieved due to the reduction in the friction coefficient.

The protruding coatings 30, 230, 330, 430 and 530 preferably include the outermost layer containing a lubricating substance. Consequently, the frictional resistance at the portion in contact with the workpiece may further be reduced.

When the tipped saw blades according to each of the above embodiments includes a configuration in which the outermost layer is determined as the linear coating elements containing a lubricating substance, an expensive paint such as, for example, a fluorine, may not be used on the entire base metal but only used partially on the convex portions. As a result, the frictional resistance may effectively be reduced while the manufacturing cost is reduced.

The exemplary embodiments according to the present invention have been described above, however, the blades according to the present invention shall not be limited to the present embodiments and may be embodied in various other forms. For example, the tipped saw blades have been illustrated in the present embodiments but shall not be limited to these. The blade may have the above-described coating in addition to a configuration including a disc-shaped base metal and cutting or grinding edges provided on the outer circumferential edge of the base metal. For example, the blade may be a circular saw blade or a side milling cutter. A various lines such as a straight line, a circular arc line or a curved line may be used as the linear shape of the coating elements. Further, one aspect is described to form a protruding coating on a first flat paint layer, however, it is not limited to. For example, a protruding coating may be applied on the side face of the base metal without the first flat paint layer.

The invention claimed is:

1. A blade comprising:
   a disc-shaped base metal;
   cutting or grinding edges provided on an outer circumferential edge of the base metal; and
   a protruding coating on a side face of the base metal along at least 75% of the outer circumference of the base metal,
   wherein the protruding coating includes:
      a plurality of first coating elements arranged in a circumferential or radial direction of the base metal at predetermined intervals; and
      a plurality of second coating elements, where each second coating element is of different width from the width of each of the first coating elements, where the plurality of second coating elements are spaced apart at predetermined intervals to collectively form a plurality of V-shapes.

2. The blade as described in claim 1, wherein each of the first coating elements and each of the second coating elements is formed as a linear line, or curved line, in an arc shape.

3. The blade as described in claim 2, wherein the plurality of first coating elements are arranged at a predetermined angle with respect to a virtual tangent line oriented tangent to the outer circumferential edge of the base metal.

4. The blade as described in claim 1, wherein the protruding coating includes an outermost layer containing a lubricant substance.

5. The blade as described in claim 1, wherein each of the V-shapes comprises a group of coating elements with arc shapes, and the V-shapes are spaced apart in the circumferential direction along at least 75% of the outer circumference of the base metal at predetermined intervals.

6. A blade comprising:
   a disc-shaped base metal with a circular hole at the radial center of the disc, the circular hole being extending in the direction perpendicular to the radial plane of the blade;
   cutting or grinding edges provided as tips on an outer circumferential edge of the base metal; and
   a protruding coating on at least one side face of the base metal along at least 75% of the outer circumference of the base metal parallel to the radial plane of the blade;
   wherein the protruding coating comprises two layers of coating elements including a first layer comprising coating elements comprising first linear lines radially spaced apart at equidistant intervals convering substantially the entire outer circumference.

7. The blade as described in claim 6, wherein the outer circumference extends beyond a certain radial distance from the radial center of the disc up to the radial edge coinciding with the circumferential border.

8. The blade as described in claim 6, wherein the outer circumference extends beyond a certain radial distance from the radial center of the disc that is greater than half of that of the radius of the blade.

9. The blade as described in claim 6, wherein the two layers of coating elements further include a second layer formed of second linear lines being of different width from the width of the first linear lines, the second linear lines being coated while being arranged over the first linear lines, wherein the first linear lines and the second linear lines collectively form V-shapes spaced apart at predetermined intervals throughout the outer circumference of the blade.

10. The blade as described in claim 6, wherein the two layers of coating elements further include a second layer formed of second curved lines of different width from the width of the first linear lines, the second curved lines being coated while being arranged over the first linear lines, wherein the first linear lines and the second curved lines collectively form V-shapes spaced apart at predetermined intervals throughout the outer circumference of the blade.

11. A blade comprising:
   a disc-shaped base metal with a circular hole at the radial center of the disc, the circular hole being extending in the direction perpendicular to the radial plane of the blade;
   cutting or grinding edges provided as tips on an outer circumferential edge of the base metal;
   a protruding coating on at least one side face of the base metal along at least 75% of the outer circumference of the base metal parallel to the radial plane of the blade,
   wherein the protruding coating comprises a first layer of coating elements and a second layer of coating elements,
   wherein the first layer of coating elements comprises a C-shaped strip-like flat surface coating element surrounding and proximate to the radial center of the blade, and
   wherein the first layer coating element is spaced a predetermined radial distance from the radial center and extends radially up to proximately where the second layer of coating elements are formed.

12. The blade as described in claim 11, wherein the second layer of coating elements includes a plurality of concentric circular arc shapes of incrementally increasing radii along at least 75% of the outer circumference of the blade.

13. A blade comprising:
- a disc-shaped base metal with a circular hole at the radial center of the disc, the circular hole being extending in the direction perpendicular to the radial plane of the blade;
- cutting or grinding edges provided as tips on an outer circumferential edge of the base metal;
- a protruding coating on at least one side face of the base metal along at least 75% of the outer circumference of the base metal parallel to the radial plane of the blade,
- wherein the protruding coating includes a plurality of coating elements spaced apart in the circumferential and radial directions of the base metal at predetermined intervals,
- wherien each of the coating elements is formed as a linear line, or a curved line in an arc shape, and
- wherein the coating elements are arranged at a predetermined angle with respect to a proximate virtual tangent line proximate to said coating elements being tangent to the outer circumferential edge of the base metal, approximately where a tip proximate to said coating elements is located.

14. The blade as described in claim 6, wherein the provided tips are mounted radially inward from the outer circumference of the blade at an angle.

* * * * *